(12) United States Patent
Garner et al.

(10) Patent No.: US 9,422,188 B2
(45) Date of Patent: Aug. 23, 2016

(54) THIN SUBSTRATES HAVING MECHANICALLY DURABLE EDGES

(75) Inventors: Sean Matthew Garner, Elmira, NY (US); Gregory Scott Glaesemann, Corning, NY (US); Xinghua Li, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 948 days.

(21) Appl. No.: 13/266,548

(22) PCT Filed: May 21, 2010

(86) PCT No.: PCT/US2010/035705
§ 371 (c)(1),
(2), (4) Date: Oct. 27, 2011

(87) PCT Pub. No.: WO2010/135614
PCT Pub. Date: Nov. 25, 2010

(65) Prior Publication Data
US 2012/0040146 A1 Feb. 16, 2012

Related U.S. Application Data

(60) Provisional application No. 61/180,230, filed on May 21, 2009.

(51) Int. Cl.
*B32B 3/02* (2006.01)
*C03C 17/00* (2006.01)
(Continued)

(52) U.S. Cl.
CPC ........... *C03C 17/002* (2013.01); *C03B 33/091* (2013.01); *C03C 17/28* (2013.01);
(Continued)

(58) Field of Classification Search
USPC .......................................................... 428/192
See application file for complete search history.

(56) References Cited

U.S. PATENT DOCUMENTS 3,577,256 A * 5/1971 Benford, Jr. et al. ........ 428/34.7
3,986,997 A 10/1976 Clark ...................... 260/29.2 M
(Continued)

FOREIGN PATENT DOCUMENTS

CA 2359366 7/2000
CN 1341083 3/2002
(Continued)

OTHER PUBLICATIONS

The State Intellectual Property Office of The People's Republic of China; Search Report; Jan. 9, 2014; pp. 1-3.
(Continued)

*Primary Examiner* — David Sample
*Assistant Examiner* — Christopher Polley
(74) *Attorney, Agent, or Firm* — Jeffrey A. Schmidt

(57) ABSTRACT

A substrate (100) comprising a sheet of either a glass, a glass ceramic, or a ceramic and having increased edge strength. A polymeric edge coating (120) prevents creation of strength limiting defects along the edges of the substrate and protects the bend strength of the edges. The substrate may also have at least two parallel high strength edges (110, 112) and an edge coating (120) of a polymeric material covering at least a portion of each of the high strength edges to preserve the high strength edges from the introduction of defects and damage to the edges. Each of the two parallel high strength edges has a bend strength that is capable of less than about 2% failure probability at a stress level of 200 MPa over a test length of 50 mm. A method of making the substrate is also provided.

19 Claims, 4 Drawing Sheets

(51) Int. Cl.
  *C03B 33/09* (2006.01)
  *C03C 17/28* (2006.01)
  *C04B 41/00* (2006.01)
  *C04B 41/45* (2006.01)
  *C04B 41/82* (2006.01)

(52) U.S. Cl.
  CPC ........ *C04B 41/009* (2013.01); *C04B 41/4572* (2013.01); *C04B 41/82* (2013.01); *C03C 2217/78* (2013.01); *C03C 2218/365* (2013.01); *Y02P 40/57* (2015.11); *Y10T 428/24777* (2015.01)

(56) References Cited

U.S. PATENT DOCUMENTS

| | | | |
|---|---|---|---|
| 5,220,358 A | 6/1993 | Brown et al. | |
| 5,674,790 A | 10/1997 | Araujo | 501/66 |
| 6,120,908 A | 9/2000 | Papanu et al. | 428/429 |
| 6,407,360 B1 | 6/2002 | Choo et al. | 219/121.67 |
| 6,815,070 B1 | 11/2004 | Burkle et al. | 428/425.6 |
| 7,998,558 B2 * | 8/2011 | Chen | B29C 63/0026 156/60 |
| 2005/0142321 A1 | 6/2005 | Miyahara et al. | |
| 2006/0021385 A1 | 2/2006 | Cimo et al. | 65/36 |
| 2007/0090100 A1 | 4/2007 | Yonai et al. | 219/121.69 |
| 2007/0144656 A1 | 6/2007 | Muromachi et al. | |
| 2008/0085401 A1 | 4/2008 | Garner et al. | 428/192 |
| 2008/0286548 A1 * | 11/2008 | Ellison et al. | 428/220 |
| 2009/0241317 A1 * | 10/2009 | Kubler et al. | 29/428 |

FOREIGN PATENT DOCUMENTS

| | | | | |
|---|---|---|---|---|
| DE | 19810325 A1 | 9/1999 | ............ | C03C 17/00 |
| EP | 528112 A1 | 5/1992 | | |
| EP | 1803601 B1 | 4/2009 | | |
| JP | S60(1985)-251138 A | 12/1985 | | |
| JP | 1997-286638 | 11/1997 | | |
| JP | 1998-95636 | 4/1998 | | |
| JP | 2002-054971 A | 2/2002 | | |
| JP | 2005-314127 | 11/2005 | | |
| JP | 2007-76077 | 3/2007 | | |
| JP | 2008-062489 | 3/2008 | | |
| JP | 2008-183599 | 8/2008 | | |
| JP | 2012527399 A | 11/2012 | | |
| WO | 2005000762 A1 | 1/2005 | | |
| WO | 2005/105681 | 11/2005 | | |
| WO | 2007/140978 A1 | 12/2007 | ............ | B65D 81/05 |
| WO | 2008077042 A1 | 6/2008 | | |
| WO | 2008104825 A1 | 9/2008 | | |
| WO | 2008136872 A3 | 4/2009 | | |

OTHER PUBLICATIONS

Japanese Final Office Action Application No. 2012-512053; dated Aug. 15, 2014.

* cited by examiner

FIG. 6
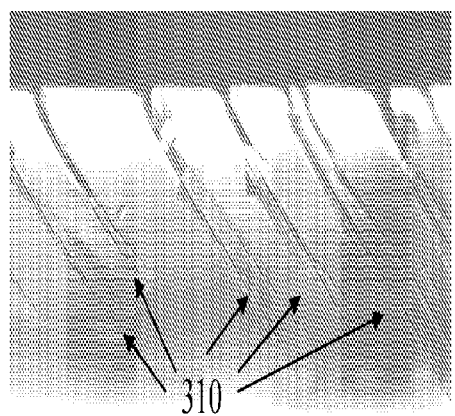
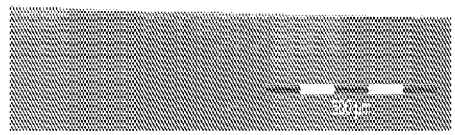
FIG. 7
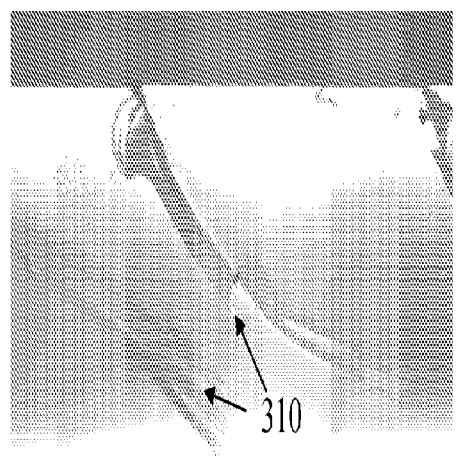
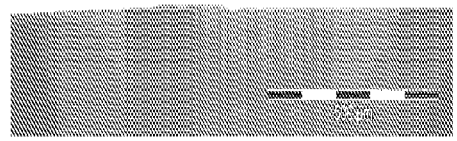
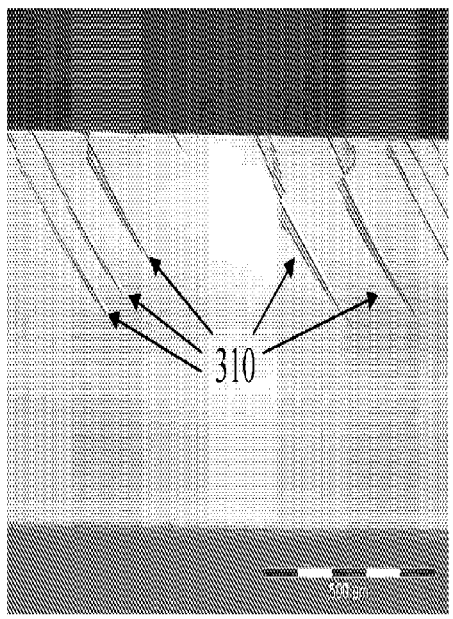
FIG. 8
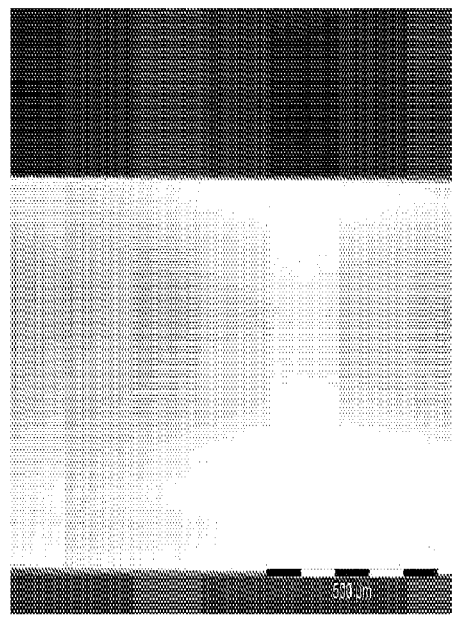
FIG. 9

THIN SUBSTRATES HAVING MECHANICALLY DURABLE EDGES

This application is a National Stage Filing under 35 USC 371 of PCT Application PCT/US10/35705, filed on May 21, 2010, which claims the benefit of priority under 35 USC 119(e) of U.S. Provisional Application Ser. No. 61/180,230 filed on May 21, 2009.

BACKGROUND

Glass substrates are currently being used as protective covers or windows for display and touch sensor devices, as well as substrates for front and back planes of electronic devices. As such, these substrates are susceptible to mechanical failure originating at flaws at the edges of the substrate. Such flaws are either created during the cutting and edge finishing process or from contact damage occurring during handling and use.

Edge finishing, which includes grinding, polishing, and/or etching of the edges of the substrate, attempts to eliminate major flaws that are generated during the cutting process and minimize chipping due to contact damage. In addition, such finishing processes have been focused on preventing damage due to edge impact from point sources. Finishing processes are generally capable of removing flaws generated during scribe and breaking processes and produce edge shapes that are more tolerant of edge impact. However, these finishing processes produce lower edge strength than is achievable. In addition, it is difficult to use such finishing processes when the substrate thickness is below about 0.3 mm. Due to the reduced contact area, substrates having thicknesses in this range are susceptible to breakage during edge impact, whether or not they have been edge finished.

SUMMARY

A substrate comprising a sheet of either a glass, a glass ceramic, or a ceramic and having increased edge strength is provided. The substrate has at least two parallel high strength edges and an edge coating of a polymeric material covering at least a portion of each of the high strength edges. The edge coating protects the high strength edges from the introduction of defects and damage to the edges and protects the bend strength of the edges. Each of the two parallel high strength edges has a bend strength that is capable of less than about 2% failure probability at 200 MPa over a test length of 50 mm. A method of making the substrate is also provided.

Accordingly, the disclosure describes a substrate. The substrate comprises: a sheet comprising at least one of a glass, a ceramic, and a glass ceramic and having a first surface, a second surface, and at least two parallel high strength edges joining the first surface and the second surface, each of the at least two parallel high strength edges having a bend strength capable of less than 2% failure probability at a stress of 200 MPa over a test length of 50 mm; and a polymeric edge coating covering at least a portion of each of the at least two parallel high strength edges, wherein the polymeric edge coating protects each of the high strength edges from the introduction of defects and damage.

The disclosure also describes a substrate for use as either a protective cover glass or as a substrate within an electronic device. The substrate comprises: a sheet comprising at least one of a glass, a ceramic, and a glass ceramic and having at least two parallel high strength edges, wherein the edges are unfinished; and a polymeric edge coating covering at least a portion of each of the at least two parallel high strength edges, wherein the polymeric edge coating preserves the bend strength of the sheet by minimizing formation of defects at the at least two parallel high strength edges.

Further, the disclosure describes a method of making a substrate. The method comprising the steps of: providing a sheet comprising at least one of a glass, a glass ceramic, and a ceramic and having a first and a second surface that are substantially parallel to each other, and at least two parallel high strength edges between the first and second surface; and depositing a polymeric edge coating on at least a portion of each of the at least two parallel high strength edges to form the substrate.

These and other aspects, advantages, and salient features will become apparent from the following detailed description, the accompanying drawings, and the appended claims. By way of non-limiting example, the various features of the embodiments may be combined as set forth in the following aspects.

According to a first aspect, there is provided a substrate, the substrate comprising:
  a. a sheet comprising at least one of a glass, a ceramic, and a glass ceramic, the sheet having a first surface, a second surface, and at least two parallel high strength edges joining the first surface and the second surface, each of the at least two parallel high strength edges having a bend strength capable of less than 2% failure probability at a stress level of 200 MPa over a test length of 50 mm; and
  b. a polymeric edge coating covering at least a portion of each of the at least two parallel high strength edges, wherein the polymeric edge coating protects each of the high strength edges from the introduction of defects and damage.

According to a second aspect, there is provided the substrate according to Aspect 1, wherein the substrate has a thickness of up to about 0.6 mm.

According to a third aspect, there is provided the substrate according to Aspect 2, wherein the substrate has a thickness of up to about 0.1 mm.

According to a fourth aspect, there is provided the substrate according to any one of Aspects 1-3, wherein the polymeric edge coating has a modulus of up to about 10 GPa.

According to a fifth aspect, there is provided the substrate according to any one of Aspects 1-4, wherein the polymeric edge coating comprises at least one of a silicone, an epoxy, an acrylate, a urethane, and combinations thereof.

According to a sixth aspect, there is provided the substrate according to any one of Aspects 1-5, wherein the polymeric edge coating has a thickness in a range from about 5 μm to about 50 μm.

According to a seventh aspect, there is provided the substrate according to any one of Aspects 1-6, where each of the at least two parallel high strength edges is slot-drawn, fusion-drawn, re-drawn, or laser cut.

According to a eighth aspect, there is provided the substrate according to any one of Aspects 1-7, wherein the substrate comprises one of a borosilicate glass, an alumino borosilicate glass, and an alkali aluminosilicate glass.

According to a ninth aspect, there is provided the substrate according to Aspect 8, wherein the alkali aluminosilicate glass comprises: 60-70 mol % $SiO_2$; 6-14 mol % $Al_2O_3$; 0-15 mol % $B_2O_3$; 0-15 mol % $Li_2O$; 0-20 mol % $Na_2O$; 0-10 mol % $K_2O$; 0-8 mol % MgO; 0-10 mol % CaO; 0-5 mol % $ZrO_2$; 0-1 mol % $SnO_2$; 0-1 mol % $CeO_2$; less than 50 ppm $As_2O_3$; and less than 50 ppm $Sb_2O_3$; wherein 12 mol %≤$Li_2O+Na_2O+K_2O$≤20 mol % and 0 mol %≤$MgO+CaO$≤10 mol %.

According to a tenth aspect, there is provided the substrate according to Aspect 8, wherein the alkali aluminosilicate glass comprises: 64 mol %≤$SiO_2$≤68 mol %; 12 mol %≤$Na_2O$≤16 mol %; 8 mol %≤$Al_2O_3$≤12 mol %; 0 mol %≤$B_2O_3$≤3 mol %; 2 mol %≤$K_2O$≤5 mol %; 4 mol %≤$MgO$≤6 mol %; and 0 mol %≤$CaO$≤5 mol %, wherein: 66 mol %≤$SiO_2+B_2O_3+CaO$≤69 mol %; $Na_2O+K_2O+B_2O_3+MgO+CaO+SrO$>10 mol %; 5 mol %≤$MgO+CaO+SrO$≤8 mol %; $(Na_2O+B_2O_3)-Al_2O_3$≤2 mol %; 2 mol %≤$Na_2O-Al_2O_3$≤6 mol %; and 4 mol %≤$(Na_2O+K_2O)-Al_2O_3$≤10 mol %, and wherein the glass has a liquidus viscosity of at least 130 kpoise.

According to an eleventh aspect, there is provided the substrate according to Aspect 8, wherein the alkali aluminosilicate glass comprises: 50-80 wt % $SiO_2$; 2-20 wt % $Al_2O_3$; 0-15 wt % $B_2O_3$; 1-20 wt % $Na_2O$; 0-10 wt % $Li_2O$; 0-10 wt % $K_2O$; and 0-5 wt % (MgO+CaO+SrO+BaO); 0-3 wt % (SrO+BaO); and 0-5 wt % ($ZrO_2+TiO_2$), wherein 0≤($Li_2O+K_2O$)/$Na_2O$≤0.5.

According to a twelfth aspect, there is provided the substrate according to any one of Aspects 1-11, wherein the substrate has at least one strengthened surface layer extending from at least one of the first surface and the second surface to a depth of layer, wherein the strengthened surface layer is under a compressive stress.

According to a thirteenth aspect, there is provided the substrate according to Aspect 12, wherein the strengthened surface layer is an ion-exchanged layer.

According to a fourteenth aspect, there is provided the substrate according to any one of Aspects 1-13, further comprising at least one layer deposited on at least one of the first surface and the second surface.

According to a fifteenth aspect, there is provided the substrate according to any one of Aspects 1-14, wherein the substrate is a protective cover glass for at least one of a hand held electronic device, an information-related terminal, and a touch sensor device.

According to a sixteenth aspect, there is provided the substrate according to any one of Aspects 1-6 or 8-15, wherein each of the at least two parallel high strength edges is unfinished.

According to a seventeenth aspect, there is provided a substrate for use as a protective cover glass or as a substrate within an electronic device, the substrate comprising:
a. a sheet comprising at least one of a glass, a ceramic, and a glass ceramic, the sheet having at least two parallel high strength edges, wherein the edges are unfinished; and
b. a polymeric edge coating covering at least a portion of each of the at least two parallel high strength edges, wherein the polymeric edge coating preserves the bend strength of the sheet by one of minimizing formation of defects at the at least two parallel high strength edges.

According to an eighteenth aspect, there is provided the substrate according to Aspect 17, wherein each of the at least two parallel high strength edges has a bend strength capable of less than 2% failure probability at a stress level of 200 MPa over a test length of 50 mm.

According to a nineteenth aspect, there is provided the substrate according to Aspect 17 of Aspect 18, wherein the polymeric edge coating has a modulus of up to about 10 GPa.

According to a twentieth aspect, there is provided the substrate according to any one of Aspects 17-19, wherein the polymeric edge coating comprises at least one of a silicone, an epoxy, an acrylate, a urethane, and combinations thereof.

According to a twenty first aspect, there is provided the substrate according to any one of Aspects 17-20, wherein the sheet comprises an alkali aluminosilicate glass.

According to a twenty second aspect, there is provided the substrate according to any one of Aspects 17-21, wherein the substrate has at least one strengthened surface layer extending from at least one of a first surface and a second surface to a depth of layer, wherein the strengthened surface layer is under a compressive stress.

According to a twenty third aspect, there is provided a method of making a substrate, the method comprising the steps of:
a. providing a sheet comprising at least one of a glass, a glass ceramic, and a ceramic and having a first and a second surface that are substantially parallel to each other, and at least two parallel high strength edges between the first and second surface, wherein each of the at least two parallel high strength edges has a bend strength capable of less than 2% failure probability at a stress level of 200 MPa over a test length of 50 mm; and
b. depositing a polymeric edge coating on at least a portion of each of the at least two parallel high strength edges to form the substrate.

According to a twenty fourth aspect, there is provided the method according to Aspect 23, wherein the step of providing the sheet comprises forming a sheet by one of fusion-drawing, slot-drawing, and redrawing.

According to a twenty fifth aspect, there is provided the method according to Aspect 23 or Aspect 24, wherein the step of providing the sheet comprises laser cutting the sheet to form the at least two parallel high strength edges.

BRIEF DESCRIPTION OF THE DRAWINGS

FIGS. 6-9 are optical micrographs of laser-cut edges; and

DETAILED DESCRIPTION

Figures 1, 2, 3, 4:
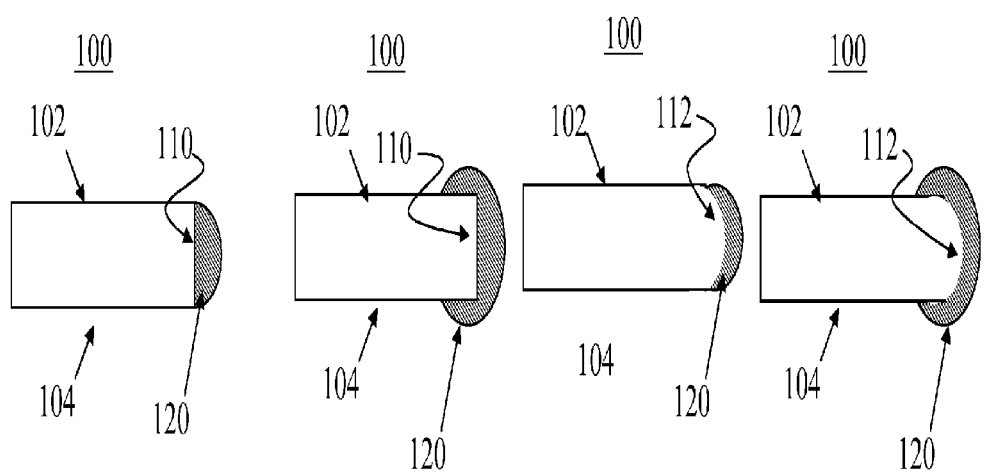
FIGS. 1-4 are schematic representations of side views of the substrates showing typical edge profile designs.

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range, as well as any sub-ranges therebetween.

Referring to the drawings in general and to FIGS. 1-4 in particular, it will be understood that the illustrations are for the purpose of describing particular embodiments and are not intended to limit the disclosure or appended claims thereto. The drawings are not necessarily to scale, and certain features and certain views of the drawings may be shown exaggerated in scale or in schematic in the interest of clarity and conciseness.

Glass substrates are currently being used as protective covers for display and touch applications, such as, but not limited to, portable communication and entertainment devices such as telephones, music players, video players, or the like; and as display screens for information-related terminals (IT) (e.g., portable or laptop computers) devices; as well as in other applications, such as electronic paper front plane and back plane substrates. Such glass substrates are susceptible to mechanical failures and breakage originating from edge flaws that are created either during the cutting and edge finishing process or from contact damage during handling, device fabrication, and use.

A substrate having increased edge strength is provided by eliminating the creation of strength limiting defects along the edges of the substrate and preserving the bend strength of the edge. The substrate comprises a sheet of either a glass, a glass ceramic, or a ceramic. Although the substrate may be referred to herein solely as a glass substrate, it is understood that the description is, unless otherwise specified, equally applicable to glass ceramic and ceramic materials, as well as multi-layer structures comprising discrete glass, glass-ceramic, and ceramic compositions. The sheet has a first surface, a second surface, and at least two parallel high strength edges joining the first and second surfaces. In one embodiment, the sheet may further include a polymeric coating on the first surface, second surface, or both. Each of the two parallel high strength edges has a bend strength that is capable of less than about 2% failure probability at a stress level of 200 MPa over a test length of 50 mm. An edge coating of a polymeric material covers at least a portion of each of the high strength edges, preserving the high strength edges from subsequent damage and preventing contamination of the edge. For example, once applied to the edge, the edge coating prevents crack systems from forming on the edge. In those embodiments in which a surface coating is present, the surface coating and edge coating can have compositions that are different from each other, and may be applied to the substrate at different times and by different processes.

In one embodiment, the substrate has a thickness of up to about 0.6 mm and, in another embodiment, has a thickness of up to about 0.4 mm. The substrate, in a third embodiment, has a thickness of up to about 0.1 mm. Due to their reduced contact area, substrates having thicknesses less than or equal to about 0.1 mm are particularly susceptible to breakage during edge impact, whether or not they have finished edges. Moreover, edge finishing using techniques such as polishing and the like are either ineffective or have not been demonstrated at thicknesses less than or equal to about 0.1 mm. It is therefore better to rely on a forming process and/or a cutting process that yields a high strength edge rather than use a finishing process to average the edge strength to a lower, uniform value.

In one embodiment, the at least two parallel high strength edges are created directly by a forming process. Such forming processes typically involve heating the glass to a temperature above the anneal point (i.e., the temperature at which the viscosity η of a glass equals $10^{13}$ Poise; also referred to as the anneal temperature). Non-limiting examples of such forming processes include down-draw processes. Such down-draw processes are known in the art and include slot-draw processes, fusion-draw processes, re-draw processes, and the like.

Figure 5:
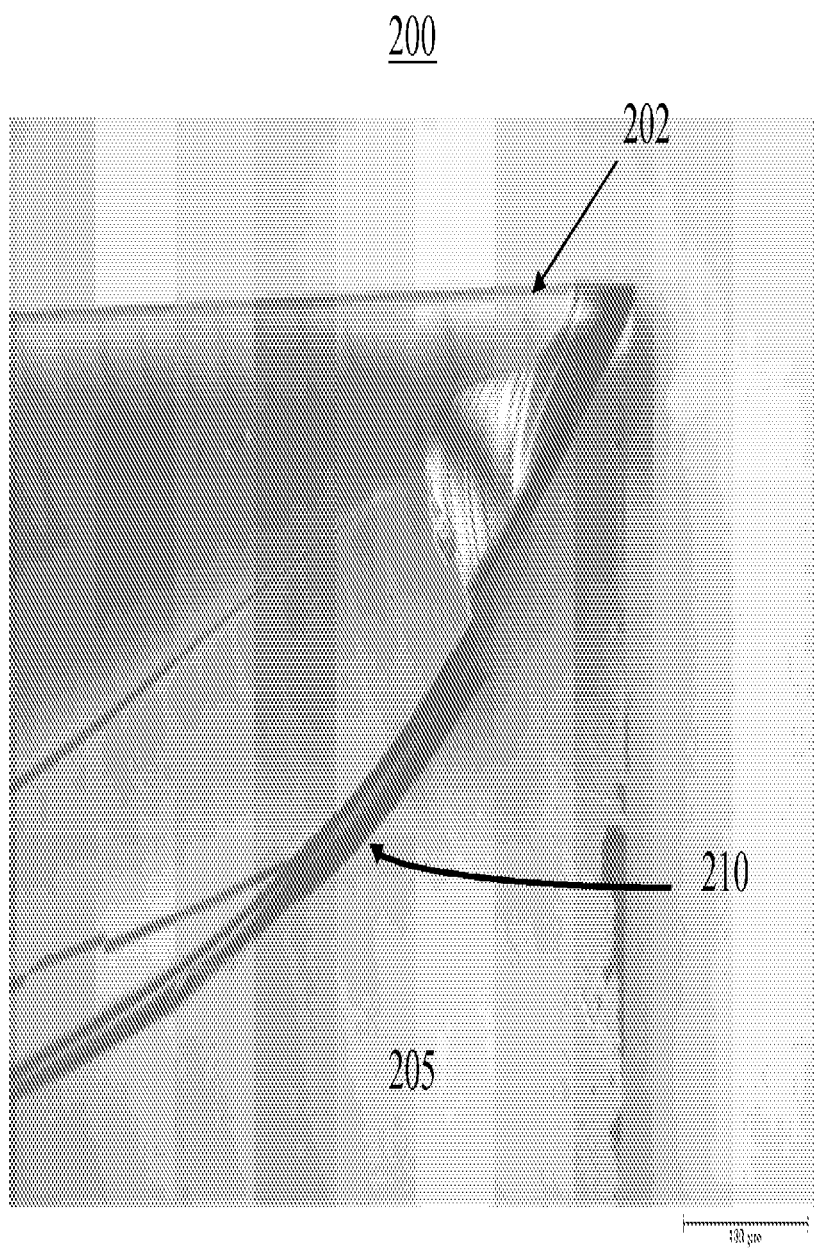
FIG. 5 is an optical micrograph of and edge of a glass substrate.

Alternatively, the high strength edges may be created by high strength cutting methods that include, but are not limited to, laser cutting techniques. Such laser cutting techniques include full-body laser separation using a $CO_2$ laser having a wavelength of 10.6 μm. In $CO_2$ full body laser cutting, a glass substrate is heated to a temperature that is near (i.e., ±50° C.) the strain point of the glass to create a vent. Although the laser cutting of a glass substrate is described herein, it is understood that the laser cutting methods described herein may be used to cut or separate the other types of substrates (e.g., ceramics, glass ceramics) described herein). In one embodiment, the glass is then rapidly quenched—typically with a water jet—after heating by the laser. Quenching produces a tensile force over the glass vent, opening the vent in the direction of the relative motion of the glass substrate. Quenching creates a tensile force on the side of the glass substrate irradiated by the laser (the laser side) that is strong enough to open up and propagate the vent in the glass. Since the tensile force on the laser side must be balanced over the thickness of the glass, a compressive force is generated on the side of the glass opposite the laser side (the back side), creating a bending momentum in the glass. Due to the bending momentum, edge quality is difficult to control. The laser-cut edge can behave differently, depending on whether tension is applied on the laser side or the back side of the glass substrate. Severe bending can induce fracture surface features that act as flaws and decrease the edge strength of the glass. The dominating fracture mode in samples having low edge strength are shear and twist defects or changes in fracture steps and planes that are known as "hackles." Low strength edges often fail due to the presence of twist hackles on the edge face. An optical micrograph of an edge 205 of a laser-cut glass substrate 200 having a twist hackle 210 is shown in FIG. 5. In FIG. 5, twist hackle 210 runs from the back side 202 (top right in FIG. 5) to the bottom left of the glass substrate 200.

High strength edges can be formed by $CO_2$ full body laser cutting by eliminating flaws such as twist hackles and the like. Such flaws can be eliminated in cutting regimes in which the temperature is balanced over the thickness of the substrate at suitable laser power densities. The median strength of such laser-cut edges is typically greater than about 400 MPa. The effect of laser power and distance between the laser beam and the quenching water jet are shown in FIGS. 3-9, which are optical micrographs of laser-cut edges. The laser power and distance between the laser and water jet used on the samples shown in FIGS. 6-9 are: a) FIG. 6: 26 W power, 14 mm distance; b) FIG. 7: 26 W power, 24 mm distance; c) FIG. 8: 35 W power, 14 mm distance; and d) FIG. 9: 35 W power, 24 mm distance. Hackles 310 were observed under the laser cutting conditions used in FIGS. 6-8, whereas the conditions used to cut the edge shown in FIG. 9 produced an edge that is free of any visible hackles or other flaws.

One non-limiting example of such full body $CO_2$ laser cutting or separation technique in which cutting parameters are optimized to eliminate hackles that lead to low strength edges is described in U.S. patent application Ser. No. 12/469,794, by Sean M. Garner et al., entitled "Waterless $CO_2$ Laser Full-Body Cutting of Thin Glass Substrates," filed May 21, 2009, in which a method for cutting glass substrates with a $CO_2$ laser without using a water jet is described. An elongated $CO_2$ laser beam and thermal diffusion are used to achieve bulk heating of a glass substrate, and subsequent surface convection loss produces a tensile/compressive/tensile stress through the thickness of the glass. A second non-limiting example of laser cutting/separation techniques is described in U.S. patent application Ser. No. 12/388,935, by Anatoli A. Abramov et al., entitled "Method of Separating Strengthened Glass," filed on Feb. 19, 2009, which describes full-body or complete cutting or separation of a strengthened glass sheet by initiating a flaw in the glass at a depth greater than that of the strengthened surface layer of the glass, and creating a vent by treating the glass with a laser to heat the glass to a temperature in a range from about 50° C. below the strain point of the glass up to a temperature between the strain point and the anneal point of the glass, the vent extending from the flaw at a vent depth greater than that of the strengthened surface layer to at least partially separate the glass. The contents of the two above-referenced U.S. patent applications are incorporated by reference herein in their entirety. Other laser separation methods in which a partial vent or median crack is formed and final separation is achieved by scribing and breaking can also be used to provide a high strength edge to substrate 100.

FIGS. 1-4 are schematic representations of side views of the substrates described herein, showing typical edge profile designs. Substrate 100 has a first surface 102, a second surface 104, and at least two parallel high strength edges 110, 112, one of which is shown in FIGS. 1-4. In one embodiment, each of the at least two parallel high strength edges has a rectangular profile 110 (FIGS. 1 and 2). Rectangular edge profile 110, in one embodiment, is formed by a cutting process such as, but not limited to, the laser cutting or separation techniques described herein. In a second embodiment, each of the at least two parallel high strength edges has a rounded profile 112 (FIGS. 3 and 4). Rounded edge profile 112, in one embodiment, is formed by a slot-draw process. Edge profiles 110, 112 have edge faces that are substantially free of visible defects and thus have a bend strength that is greater than edges formed by mechanical polishing methods. Edges that are finished by chemical methods, such as etching or the like, produce rounded edge profiles having edge strengths that are also greater than those achieved by mechanical finishing. However, chemical etching processes can be incompatible with the substrate or structures that are fabricated on the substrate. Each of the high strength edges 110, 112 of substrate 100 has a bend strength, such as a four-point bend edge strength, capable of less than 2% failure probability at a stress level of 200 MPa over a test length of 50 mm.

At least a portion of the high strength edges are coated with edge coating 120 comprising a polymeric material (FIGS. 1-4) such as, but not limited to, those flexible or elastic polymeric materials known in the art. In one embodiment, the polymeric material comprises at least one of a silicone, an epoxy, an acrylate, a urethane, and combinations thereof having a modulus of less than about 10 GPa. Non-limiting examples of polymeric materials include UV curable optical adhesives or optical cements such as those manufactured by Norland™ Optical Adhesives (NOA60. NOA61, NOA63, NOA65, NOA68, NOA68T, NOA71, NOA72, NOA73, NOA74, NOA75, NOA76, NOA78, NOA81, NOA83H, NOA84, NOA88, NOA89), Dow Corning™ (Sylgard 184 and other thermally curing silicones), Dymax™, and others. In particular, non-limiting examples of such materials are described in U.S. Pat. No. 3,986,997 by Howard A. Clark, entitled "Pigment-Free Coating Compositions," issued Oct. 19, 1976, which describes acidic dispersions of colloidal silica and hydroxylated sesquisiloxane in an alcohol-water medium to provide abrasion resistant coatings. The contents of U.S. Pat. No. 3,986,997 are incorporated by reference herein in their entirety.

Edge coating 120 of the polymeric material has a thickness in a range from about 5 μm up to about 50 μm, and can be applied by those methods known in the art, such as dipping, painting, spraying, dispensing from a die, or the like. If the substrate is used for device manufacturing or if a patterned layer is formed on the substrate, the edge coating can be applied to the substrate either before or after device processing. Edge coating 120 primarily serves a mechanical function, preserving the high bend strength of the as-formed or cut high strength edges by protecting the substrate edge from further damage. In some embodiments, edge coating 120 need not be transparent.

The at least two parallel high strength edges are unfinished; i.e., they are as-formed and not finished by mechanical or chemical means; i.e., they are neither ground nor etched. The combination of the at least two parallel high strength edges and edge coating 120 described herein does not require such finishing. Consequently, the number of process steps to make substrate 100 is decreased while overall substrate yield is increased.

As previously stated, edge coating 120 coats at least a portion of each high strength edge. In some embodiments, examples of which are shown in FIGS. 2 and 4, edge coating additionally covers a portion of first and second surfaces 102, 104 adjacent to the high strength edge. However, substrate 100 does not require protective coatings on first surface 102 and second surface 104.

In some instances, various coatings or films, such as strengthening, anti-scratch, anti-reflective, anti-glare coatings or films, or the like, such as those are known in the art, may be applied to at least one of first surface 102 and second surface 104 of substrate 100. Edge coating 120 need not have the same composition of such coatings, nor does edge coating 120 have to be applied at the same time as any other surface coating that may be present. For example, a coating may be applied to at least one of first surface 102 and second surface 104 immediately after substrate 100 is formed, whereas high strength edges can be cut into or otherwise formed on substrate 100 and edge coatings 120 applied to the high strength edges after a device is fabricated on substrate 120, or just before substrate 100 is incorporated into a device.

The substrate 100 comprises, consists essentially of, or consists of a glass, a glass ceramic material, or a ceramic material suitable for applications such as thin (i.e., ≤0.6 mm or, alternatively, ≤0.4 mm). The substrate can have either a single, multiple, or graded composition, such as that produced by chemical strengthening of glass by ion exchange and, in one embodiment, is rollable (i.e., a continuous sheet of the substrate can be rolled up) or bendable. Non-limiting examples of such glass ceramic and ceramic materials include β-spogamene, β-quartz, nepheline, and the like.

In some embodiments, the substrate 100 comprises, consists essentially of, or consists of one of a borosilicate glass, an aluminoborosilicate glass, and an alkali aluminosilicate glass. In one embodiment, the substrate is an alkali aluminosilicate glass comprising: 60-70 mol % $SiO_2$; 6-14 mol % $Al_2O_3$; 0-15 mol % $B_2O_3$; 0-15 mol % $Li_2O$; 0-20 mol % $Na_2O$; 0-10 mol % $K_2O$; 0-8 mol % $MgO$; 0-10 mol % $CaO$; 0-5 mol % $ZrO_2$; 0-1 mol % $SnO_2$; 0-1 mol % $CeO_2$; less than 50 ppm $As_2O_3$; and less than 50 ppm $Sb_2O_3$; wherein 12 mol % ≤ $Li_2O+Na_2O+K_2O$ ≤ 20 mol % and 0 mol % ≤ $MgO+CaO$ ≤ 10 mol %. In another embodiment, the alkali aluminosilicate glass comprises 64 mol % ≤ $SiO_2$ ≤ 68 mol %; 12 mol % ≤ $Na_2O$ ≤ 16 mol %; 8 mol % ≤ $Al_2O_3$ ≤ 12 mol %; 0 mol % ≤ $B_2O_3$ ≤ 3 mol %; 2 mol % ≤ $K_2O$ ≤ 5 mol %; 4 mol % ≤ $MgO$ ≤ 6 mol %; and 0 mol % ≤ $CaO$ ≤ 5 mol %, wherein: 66 mol % ≤ $SiO_2+B_2O_3+CaO$ ≤ 69 mol %; $Na_2O+K_2O+B_2O_3+MgO+CaO+SrO$ > 10 mol %; 5 mol % ≤ $MgO+CaO+SrO$ ≤ 8 mol %; ($Na_2O+B_2O_3$)—$Al_2O_3$ ≤ 2 mol %; 2 mol % ≤ $Na_2O$—$Al_2O_3$ ≤ 6 mol %; and 4 mol % ≤ ($Na_2O+K_2O$)—$Al_2O_3$ ≤ 10 mol %. In a third embodiment, the alkali aluminosilicate glass comprises: 50-80 wt % $SiO_2$; 2-20 wt % $Al_2O_3$; 0-15 wt % $B_2O_3$; 1-20 wt % $Na_2O$; 0-10 wt % $Li_2O$; 0-10 wt % $K_2O$; and 0-5 wt % ($MgO+CaO+SrO+BaO$); 0-3 wt % ($SrO+BaO$); and 0-5 wt % ($ZrO_2+TiO_2$), wherein 0 ≤ ($Li_2O+K_2O$)/$Na_2O$ ≤ 0.5.

In one particular embodiment, the alkali aluminosilicate glass has the composition: 66.7 mol % $SiO_2$; 10.5 mol % $Al_2O_3$; 0.64 mol % $B_2O_3$; 13.8 mol % $Na_2O$; 2.06 mol % $K_2O$; 5.50 mol % $MgO$; 0.46 mol % $CaO$; 0.01 mol % $ZrO_2$; 0.34 mol % $As_2O_3$; and 0.007 mol % $Fe_2O_3$. In another particular embodiment, the alkali aluminosilicate glass has the composition: 66.4 mol % $SiO_2$; 10.3 mol % $Al_2O_3$; 0.60 mol % $B_2O_3$; 4.0 mol % $Na_2O$; 2.10 mol % $K_2O$; 5.76 mol % $MgO$; 0.58 mol % $CaO$; 0.01 mol % $ZrO_2$; 0.21 mol % $SnO_2$; and 0.007 mol % $Fe_2O_3$. The alkali aluminosilicate glass is, in some embodiments, substantially free of lithium, whereas in other embodiments, the alkali aluminosilicate glass is substantially free of at least one of arsenic, antimony, and barium.

The alkali aluminosilicate glass, in one embodiment, is down-drawable; i.e., formable by methods such as slot-draw or fusion-draw processes that are known in the art. In these instances, the glass has a liquidus viscosity of at least 130 kpoise. Non-limiting examples of such alkali aluminosilicate glasses are described in U.S. patent application Ser. No. 11/888,213, by Adam J. Ellison et al., entitled "Down-Drawable, Chemically Strengthened Glass for Cover Plate," filed on Jul. 31, 2007, which claims priority from U.S. Provisional Patent Application 60/930,808, filed on May 22, 2007, and having the same title; U.S. patent application Ser. No. 12/277,573, by Matthew J. Dejneka et al., entitled "Glasses Having Improved Toughness and Scratch Resistance," filed on Nov. 25, 2008, which claims priority from U.S. Provisional Patent Application 61/004,677, filed on Nov. 29, 2007, and having the same title; U.S. patent application Ser. No. 12/392,577, by Matthew 3. Dejneka et al., entitled "Fining Agents for Silicate Glasses," filed Feb. 25, 2009, which claims priority from U.S. Provisional Patent Application No. 61/067,130, filed Feb. 26, 2008, and having the same title; U.S. patent application Ser. No. 12/393,241 by Matthew J. Dejneka et al., entitled "Ion-Exchanged, Fast Cooled Glasses," filed Feb. 26, 2009, which claims priority from U.S. Provisional Patent Application No. 61/067,732, filed Feb. 29, 2008. and having the same title; and U.S. Provisional Patent Application No. 61/087,324, by Kristen L. Barefoot et al., entitled "Chemically Tempered Cover Glass," filed Aug. 8, 2008, the contents of which are incorporated herein by reference in their entirety.

In one embodiment, substrate 100 comprises, consists essentially of, or consists of an alkali aluminosilicate glass that is either thermally or chemically strengthened. The strengthened alkali aluminosilicate glass has strengthened surface layers extending from first surface 102 and second surface 104 to a depth of layer below each surface. The strengthened surface layers are under compressive stress, whereas a central region of substrate 100 is under tension, or tensile stress, so as to balance forces within the glass. In thermal strengthening (also referred to herein as "thermal tempering"), substrate 100 is heated up to a temperature that is greater than the strain point of the glass but below the softening point of the glass and rapidly cooled to a temperature below the strain point to create strengthened layers at the surfaces of the glass. In another embodiment, substrate 100 can be strengthened chemically by a process known as ion exchange. In this process, ions in the surface layer of the glass are replaced by—or exchanged with—larger ions having the same valence or oxidation state. In one particular embodiment, the ions in the surface layer and the larger ions are monovalent alkali metal cations, such as $Li^+$ (when present in the glass), $Na^+$, $K^+$, $Rb^+$, and $Cs^+$. Alternatively, monovalent cations in the surface layer may be replaced with monovalent cations other than alkali metal cations, such as $Ag^+$ or the like.

Ion exchange processes are typically carried out by immersing glass in a molten salt bath containing the larger ions to be exchanged with the smaller ions in the glass. It will be appreciated by those skilled in the art that parameters for the ion exchange process, including, but not limited to, bath composition and temperature, immersion time, the number of immersions of the glass in a salt bath (or baths), use of multiple salt baths, additional steps such as annealing, washing, and the like, are generally determined by the composition of the glass and the desired depth of layer and compressive stress of the glass as a result of the strengthening operation. By way of example, ion exchange of alkali metal-containing glasses may be achieved by immersion in at least one molten bath containing a salt such as, but not limited to, nitrates, sulfates, and chlorides of the larger alkali metal ion. The temperature of the molten salt bath typically is in a range from about 380° C. up to about 450° C., while immersion times range from about 15 minutes up to about 16 hours. However, temperatures and immersion times different from those described above may also be used. Such ion exchange treatments typically result in strengthened alkali aluminosilicate glasses having depths of layer ranging from about 10 μm up to at least 50 μm with a compressive stress ranging from about 200 MPa up to about 800 MPa, and a central tension of less than about 100 MPa.

Non-limiting examples of ion exchange processes are provided in the U.S. patent applications and provisional patent applications that have been previously referenced hereinabove. In addition, non-limiting examples of ion exchange processes in which glass is immersed in multiple ion exchange baths, with washing and/or annealing steps between immersions, are described in U.S. Provisional Patent Application No. 61/079,995, by Douglas C. Allan et al., entitled "Glass with Compressive Surface for Consumer Applications," filed Jul. 11, 2008, in which glass is strengthened by immersion in multiple, successive, ion exchange treatments in salt baths of different concentrations; and U.S. Provisional Patent Application No. 61/084,398, by Christopher M. Lee et al., entitled "Dual Stage Ion Exchange for Chemical Strengthening of Glass," filed Jul. 29, 2008, in which glass is strengthened by ion exchange in a first bath is diluted with an effluent ion, followed by immersion in a second bath having a smaller concentration of the effluent ion than the first bath. The contents of U.S. Provisional Patent Application Nos. 61/079,995 and No. 61/084,398 are incorporated herein by reference in their entirety.

A method of making a substrate having increased edge strength, described hereinabove, is also provided. A sheet comprising at least one of a glass, glass ceramic, and a ceramic is first provided. The sheet has a first surface, a second surface, and at least two parallel high strength edges. As previously described herein, the at least two parallel high strength edges are, in one embodiment, created directly by a forming process, such as down-draw processes, fusion-draw processes, slot-draw processes, re-drawing processes, and the like, that involves heating the sheet to a temperature above the anneal point of the sheet. Alternatively, the high strength edges may be created by high strength cutting methods that include, but are not limited to, the laser cutting techniques described herein.

A polymeric edge coating is then deposited on at least a portion of each of the two parallel high strength edges to form the substrate. The polymeric edge coating, in one embodiment, has a modulus of less than about 10 GPa, and comprises a polymeric material, such as those described hereinabove. Each of the high strength edges of the substrate has a bend strength, such as a four-point bend edge strength, capable of less than 2% failure probability at a stress level of 200 MPa over a test length of 50 mm.

EXAMPLE

The following example illustrates some of the features and advantages of the substrate and methods described herein and is in no way intended to limit either the disclosure or the appended claims thereto.

The edge strength of fusion-drawn Corning EAGLE XG™ aluminoborosilicate glass samples and full-body laser-cut edges, was tested using a four point bending test. Each sample tested had a length of 50 mm and a thickness of 0.63 mm. Testing of a given sample was stopped if a stress level of 280 MPa was reached without sample failure.

Figure 10:
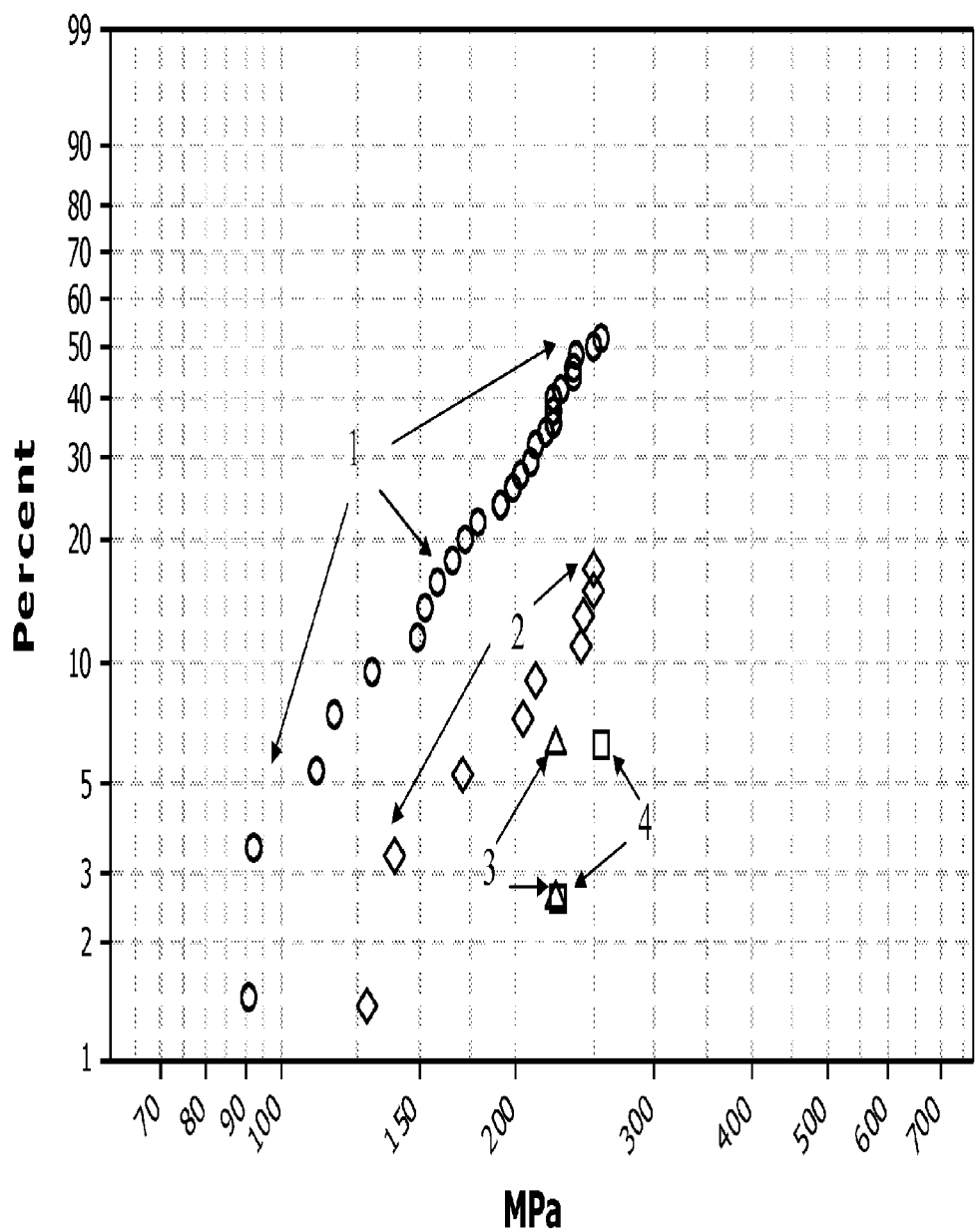
FIG. 10 is a Weibull plot of failure probabilities obtained for sample sets that were strength tested using a four-point bending test.

FIG. 10 is a Weibull plot of failure probabilities obtained for sets of samples having low strength edges (Data set 1 in Table 1 and groups 1 and 2 in FIG. 10), and having high strength laser-cut edges (Data set 2 and groups 3 and 4 in FIG. 10), as described herein. The samples classified as having low edge strength have full-body laser-cut edges that contain shear and twist defects and/or changes in fracture steps and/or planes that are known as "hackles" (see FIGS. 5-8). Such hackles lead to failure of the edge (FIG. 5). Although the high strength edges are also the product of full-body laser cutting, the laser cutting parameters (e.g., speed of translation of the laser and quenching streams (if present) along the surface of the glass substrate, distance between the laser and the quenching stream, etc.) have been optimized to eliminate hackles and other edge defects and thus produce a high strength edge (FIG. 4).

Edge strength testing was carried out up to a tensile stress of 280 MPa, The results of the edge strength testing are listed in Table 1, which lists the tensile stress at which individual samples failed. The term the "laser side," refers to the surface of the sample exposed to the laser during the laser-cutting process, whereas the "backside" refers to the side of the sample opposite the laser side. If a sample did not fail at a tensile stress less than or equal to 280 MPa, the sample was deemed to have "passed" the edge strength test, as noted by "pass" in Table 1.

TABLE 1

Results of edge strength testing.

| Sample No. | Tensile Stress (MPa) Data set 1 | | Tensile Stress (MPa) Data set 2 | |
|---|---|---|---|---|
| | Backside | Laser Side | Backside | Laser Side |
| 1 | 153 | 244 | Pass | Pass |
| 2 | Pass | Pass | Pass | Pass |
| 3 | 208 | Pass | Pass | Pass |
| 4 | 111 | Pass | Pass | Pass |
| 5 | 91 | Pass | 257 | Pass |
| 6 | 190 | 129 | Pass | Pass |
| 7 | Pass | Pass | Pass | Pass |
| 8 | 237 | Pass | Pass | Pass |
| 9 | 172 | Pass | Pass | Pass |
| 10 | 198 | Pass | Pass | Pass |
| 11 | Pass | Pass | Pass | Pass |
| 12 | Pass | Pass | Pass | Pass |
| 13 | Pass | Pass | Pass | Pass |
| 14 | 222 | 140 | Pass | Pass |
| 15 | 223 | Pass | Pass | Pass |
| 16 | 236 | 242 | Pass | 225 |
| 17 | Pass | Pass | Pass | Pass |
| 18 | Pass | Pass | Pass | Pass |
| 19 | 223 | Pass | Pass | Pass |
| 20 | Pass | Pass | Pass | Pass |
| 21 | Pass | Pass | Pass | Pass |
| 22 | Pass | Pass | Pass | Pass |
| 23 | Pass | Pass | Pass | Pass |
| 24 | Pass | Pass | Pass | Pass |
| 25 | Pass | 170 | 226 | Pass |
| 26 | 149 | 204 | Pass | Pass |
| 27 | 92 | Pass | Pass | 224 |
| 28 | Pass | Pass | | |
| 29 | 203 | Pass | | |
| 30 | 239 | Pass | | |
| 31 | 218 | Pass | | |
| 32 | 257 | 212 | | |
| 33 | 228 | Pass | | |
| 34 | 117 | Pass | | |
| 35 | Pass | Pass | | |
| 36 | Pass | Pass | | |
| 37 | 251 | Pass | | |
| 38 | Pass | Pass | | |
| 39 | Pass | Pass | | |
| 40 | 211 | Pass | | |
| 41 | Pass | Pass | | |
| 42 | 158 | Pass | | |
| 43 | 178 | Pass | | |
| 44 | 165 | Pass | | |
| 45 | Pass | Pass | | |
| 46 | Pass | Pass | | |
| 47 | 131 | Pass | | |
| 48 | Pass | Pass | | |
| 49 | Pass | Pass | | |
| 50 | | Pass | | |
| 51 | | Pass | | |

For the samples having low strength edges, backside and laser side data sets (Data set 1 in Table 1 and groups 1 and 2 in FIG. 10) of about 50 samples each, the failure probability at a stress level of 200 MPa ranged from 5% to 30%. Backside and laser side data sets for samples having high strength edges (Data set 2 in Table 1 and groups 3 and 4 in FIG. 10), each consisted of 27 samples. For this combined number of 54 samples, no failures occurred at stress levels of less than 200 MPa, and only two samples in each set failed below 280 MPa. These results demonstrate the ability to create high strength edges capable of <2% failure probability at a stress level of 200 MPa or greater.

While typical embodiments have been set forth for the purpose of illustration, the foregoing description should not be deemed to be a limitation on the scope of the disclosure or appended claims. Accordingly, various modifications, adaptations, and alternatives may occur to one skilled in the art without departing from the spirit and scope of the present disclosure or the appended claims.

What is claimed is:

1. A substrate comprising:
   a. a sheet comprising at least one material selected from the group consisting of a glass, a ceramic, and a glass ceramic, the sheet having a first surface, a second surface, and at least two parallel edges joining the first surface and the second surface, each of the at least two parallel edges having a bend strength capable of less than 2% failure probability at a stress level of 200 Map over a test length of 50 mm; and
   b. a polymeric edge coating covering at least a portion of each of the at least two parallel edges, wherein the polymeric edge coating has a thickness in a range from about 5 μm to about 50 μm and protects each of the edges from the introduction of defects and damage, and wherein the first surface of the sheet and the second surface of the sheet are each entirely free from a coating.

2. The substrate according to claim 1, wherein the substrate has a thickness of up to about 0.6 mm.

3. The substrate according to claim 2, wherein the substrate has a thickness of up to about 0.1 mm.

4. The substrate according to claim 1, wherein the polymeric edge coating has a modulus of up to about 10 GPa.

5. The substrate according to claim 1, wherein the polymeric edge coating comprises at least one material selected from the group consisting of a silicone, an epoxy, an acrylate, a urethane, and combinations thereof.

6. The substrate according to claim 1, where each of the at least two parallel edges is slot-drawn, fusion-drawn, re-drawn, or laser cut.

7. The substrate according to claim 1, wherein the substrate has at least one strengthened surface layer extending from at least one of the first surface and the second surface to a depth of layer, wherein the strengthened surface layer is under a compressive stress.

8. The substrate according to claim 7, wherein the strengthened surface layer is an ion-exchanged layer.

9. The substrate according to claim 1, wherein the substrate is a protective cover glass for use in at least one device selected from the group consisting of a hand held electronic device, an information-related terminal, and a touch sensor device.

10. The substrate according to claim 1, wherein each of the at least two parallel edges is unfinished.

11. A substrate comprising:
    a. a sheet comprising at least one material selected from the group consisting of a glass, a ceramic, and a glass ceramic, the sheet having a first surface, a second surface, and at least two parallel full-body laser-cut edges joining the first surface and the second surface, each of the at least two parallel full-body laser-cut edges having edge faces that are substantially free of visible defects to provide a bend strength capable of less than 2% failure probability at a stress level of 200 MPa over a test length of 50 mm; and
    b. a polymeric edge coating covering at least a portion of each of the at least two parallel edges, wherein the polymeric edge coating has a thickness in a range from about 5 μm to about 50 μm and protects each of the edges from the introduction of defects and damage, and wherein the first surface of the sheet and the second surface of the sheet are each entirely free from a coating.

12. The substrate according to claim 11, wherein the substrate has a thickness of up to about 0.6 mm.

13. The substrate according to claim 12, wherein the substrate has a thickness of up to about 0.1 mm.

14. The substrate according to claim 11, wherein the polymeric edge coating has a modulus of up to about 10 GPa.

15. The substrate according to claim 11, wherein the polymeric edge coating comprises at least one material selected from the group consisting of a silicone, an epoxy, an acrylate, a urethane, and combinations thereof.

16. The substrate according to claim 11, wherein the substrate has at least one strengthened surface layer extending from at least one of the first surface and the second surface to a depth of layer, wherein the strengthened surface layer is under a compressive stress.

17. The substrate according to claim 16, wherein the strengthened surface layer is an ion-exchanged layer.

18. The substrate according to claim 11, wherein the substrate is a protective cover glass for use in at least one of device selected from the group consisting of a hand held electronic device, an information-related terminal, and a touch sensor device.

19. The substrate according to claim 11, wherein each of the at least two parallel edges is unfinished.

* * * * *